US011401861B1

(12) United States Patent
Kerth (10) Patent No.: US 11,401,861 B1
(45) Date of Patent: Aug. 2, 2022

(54) PUMPED HEAT ENERGY STORAGE SYSTEM WITH ANNULAR DUCTING ARRANGEMENT (71) Applicant: DRESSER-RAND COMPANY, Houston, TX (US)

(72) Inventor: Jason M. Kerth, Houston, TX (US)

(73) Assignee: Dresser-Rand Company, Houston, TX (US)

(*) Notice: Subject to any disclaimer, the term of this patent is extended or adjusted under 35 U.S.C. 154(b) by 0 days.

(21) Appl. No.: 17/761,308

(22) PCT Filed: Dec. 9, 2020

(86) PCT No.: PCT/US2020/063882
§ 371 (c)(1),
(2) Date: Mar. 17, 2022

(87) PCT Pub. No.: WO2021/119049
PCT Pub. Date: Jun. 17, 2021

Related U.S. Application Data (60) Provisional application No. 62/945,521, filed on Dec. 9, 2019.

(51) Int. Cl.
F02C 6/14 (2006.01)
F28D 20/00 (2006.01)
F02C 1/10 (2006.01)

(52) U.S. Cl.
CPC ............. F02C 6/14 (2013.01); F02C 1/105 (2013.01); F28D 20/0056 (2013.01); F05D 2250/311 (2013.01); F05D 2260/42 (2013.01); F05D 2260/60 (2013.01); F28D 2020/0078 (2013.01)

(58) Field of Classification Search
CPC ........ F02C 6/14; F02C 1/105; F28D 20/0056; F28D 2020/0078; F05D 2250/311; F05D 2260/42; F05D 2260/60
See application file for complete search history.

(56) References Cited

U.S. PATENT DOCUMENTS

| 8,627,665 | B2 | 1/2014 | Ruer | |
| 2019/0162482 | A1* | 5/2019 | Kerth | F28C 3/14 |
| 2020/0165967 | A1* | 5/2020 | Kerth | F02C 6/14 |

FOREIGN PATENT DOCUMENTS

| WO | 2009103106 A2 | 8/2009 |
| WO | 2019013898 A1 | 1/2019 |

OTHER PUBLICATIONS

PCT International Search Report and Written Opinion dated Feb. 24, 2021 corresponding to PCT Application No. PCT/US2020/063882 filed Dec. 9, 2020.

* cited by examiner

Primary Examiner — Shafiq Mian (57) ABSTRACT

A pumped heat energy storage (PHES) system, involving an annular ducting arrangement is provided. Disclosed embodiments are believed to resolve the issue of containing a high temperature working fluid at elevated pressure by appropriately compartmentalizing by way of the annular ducting arrangement the functions of temperature management and pressure containment in a cost-effective and reliable manner.

23 Claims, 8 Drawing Sheets

PUMPED HEAT ENERGY STORAGE SYSTEM WITH ANNULAR DUCTING ARRANGEMENT

This application claims benefit of the Dec. 9, 2019 filing date of U.S. provisional application 62/945,521, which is incorporated by reference herein.

BACKGROUND

Disclosed embodiments relate generally to the field of pumped heat energy storage (PHES) systems, and, more particularly, to PHES systems involving annular ducting arrangements.

PHES systems store excess electrical power in the form of thermal energy during periods of excess electrical generation that, for example, may be available in an electrical grid. Conversely, during periods of high demand of electricity, PHES systems use the stored thermal energy to generate electricity, which is transferable to the electrical grid to meet the high demand. In the PHES system, a motor may utilize electrical energy to drive a heat pump cycle during a charging cycle. The heat pump cycle effectively moves thermal energy from a cold reservoir to a hot reservoir to store the thermal energy. When desired, a heat engine cycle may be utilized to extract and convert the stored thermal energy to produce mechanical energy, which may be utilized to generate electricity.

DETAILED DESCRIPTION

The present inventor has recognized that cycle efficiency in a PHES system generally improves with higher temperature of a working fluid that, for example, flows between the hot turbomachinery and the hot stores. Non-limiting examples of the working fluid may be air, nitrogen, argon, etc. Furthermore, the higher temperature would lead to relatively smaller store volume, which would be conducive to lowering the cost of the PHES system. In an idealized implementation, this temperature should therefore be as high as feasible.

The present inventor has further recognized that appropriately containing a high-temperature, high-pressure flow of the working fluid in a real-world implementation of a PHES system can present several challenges. For instance, low-cost materials, such as carbon steel, tend to lose their strength at high temperature. At substantially elevated temperatures, high-temperature alloys, such as nickel-base alloys, cobalt-base alloys, etc., may be necessary, since such high-temperature alloys maintain favorable strength at high temperatures. However, such alloys are costly and are difficult to fabricate, and consequently their use in a cost-effective implementation of a PHES system should ideally be minimized or at least substantially reduced.

The stores and ducts involved in a practical PHES system may be voluminous, and, therefore, it would not be cost-effective to fabricate such components solely relying on high-temperature alloys. Furthermore, even if one uses high-temperature alloys, the temperature level, in certain situations, could exceed the temperature limits of these alloys, and, in these situations, the high-temperature alloys may have to be coated with a thermally-insulating coating to protect the alloys from the high-temperature flow, and this would further add to the cost and complexity of the stores and ducts involved.

Disclosed embodiments are believed to resolve the issue of containing the high-temperature working fluid at elevated pressure by appropriately compartmentalizing the functions of temperature management and pressure containment in a cost-effective and reliable manner. In a disclosed PHES system, this can be favorably achieved by constructing at least portions of the high-temperature section of the system with an annular configuration.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may.

It is noted that disclosed embodiments need not be construed as mutually exclusive embodiments, since aspects of such disclosed embodiments may be appropriately combined by one skilled in the art depending on the needs of a given application.

Figure 1:
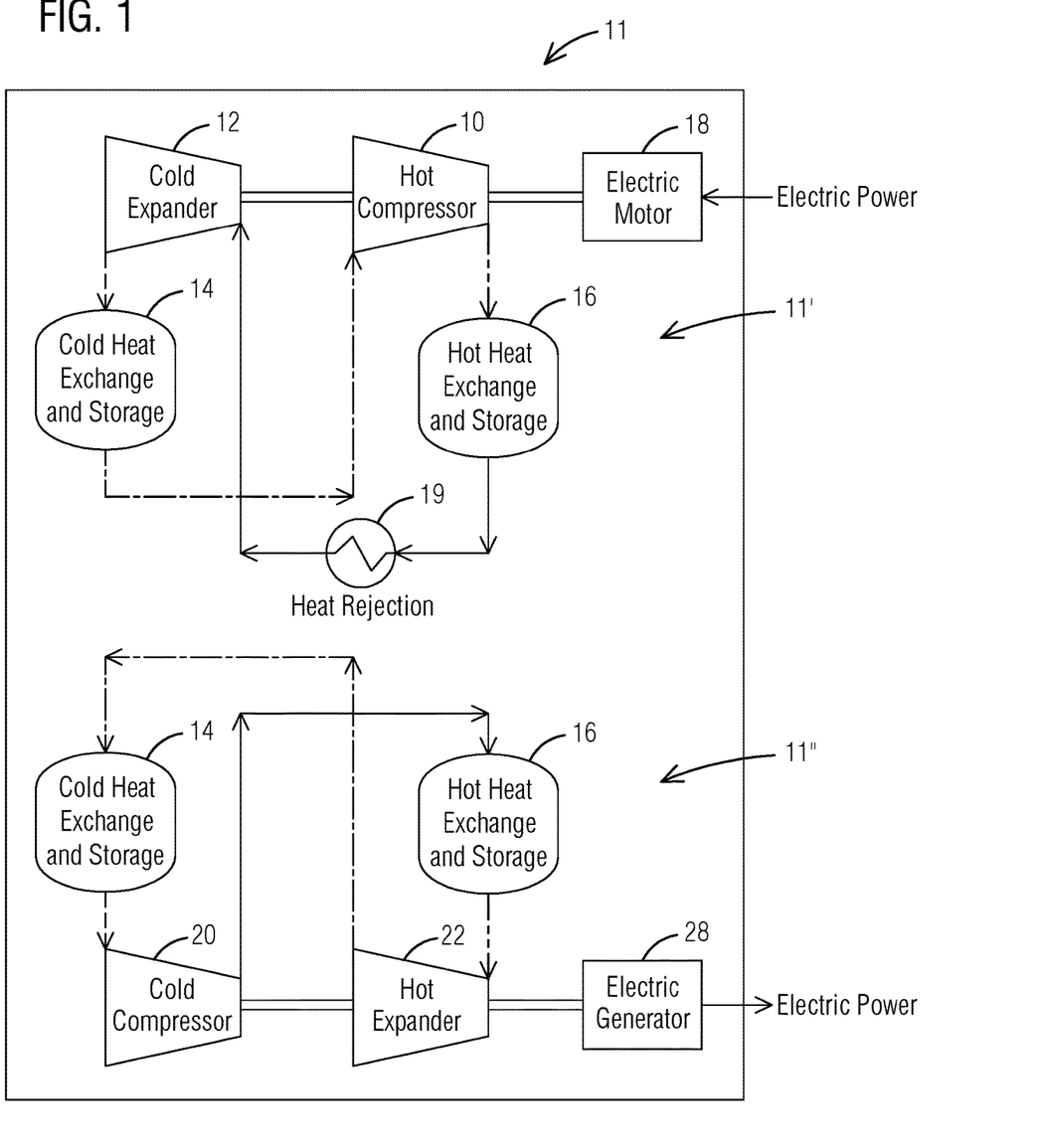
FIG. 1 is a flow diagram of an idealized overlapped cycle as may be used, without limitation, in a disclosed PHES system.

FIG. 1 is an idealized flow diagram regarding a PHES thermodynamic cycle as may be arranged in a disclosed PHES system 11. In certain embodiments, PHES system 11 may be configured to perform an overlapped cycle. That is, the PHES thermodynamic cycle may be an overlapped cycle.

As can be appreciated in FIG. 1, in a thermodynamic charging subsystem 11' of PHES system 11, charging turbomachinery—such as comprising a hot compressor 10 and a cold expander 12—is arranged to move thermal energy from a cold heat exchange and thermal storage apparatus 14 towards a hot heat exchange and storage apparatus 16. That is, during the charging portion of the cycle performed by thermodynamic charging subsystem 11', the system operates as a heat pump using work produced, for example, by an electric motor 18 powered with electrical power available from a source of electrical power—such as may be sourced from renewable and/or non-renewable resources (e.g. wind, solar, natural gas, oil, etc.), and which could be (but need not be) arranged in an electric grid—to effectively move heat against its natural gradient from a cooler region to a hotter region and store the available energy in the form of heat.

Since a PHES cycle, like any real-world thermodynamic system, involves irreversible energy losses or dissipation, the system involves a heat rejection device 19 arranged to reject such energy losses or dissipation. Absence of heat rejection would imply a perpetual motion machine, which is a physical impossibility. Although FIG. 1 illustrates the heat rejection located in the charging portion of the cycle, it will be appreciated that the heat rejection could be located in the discharging portion of the cycle, or, alternatively, could be located both in the charging portion of the cycle and in the discharging portion of the cycle.

As can be further appreciated in FIG. 1, in a thermodynamic discharging subsystem 11" of PHES system 11, discharging turbomachinery—such as comprising a cold compressor 20 and a hot expander 22—is arranged to move thermal energy from hot heat exchange storage apparatus 16 towards cold heat exchange storage apparatus 14. That is, during the discharging portion of the cycle, the system operates as a heat engine where work can be extracted to, for example, drive an electric generator 28 and generate electrical energy.

Figure 2:
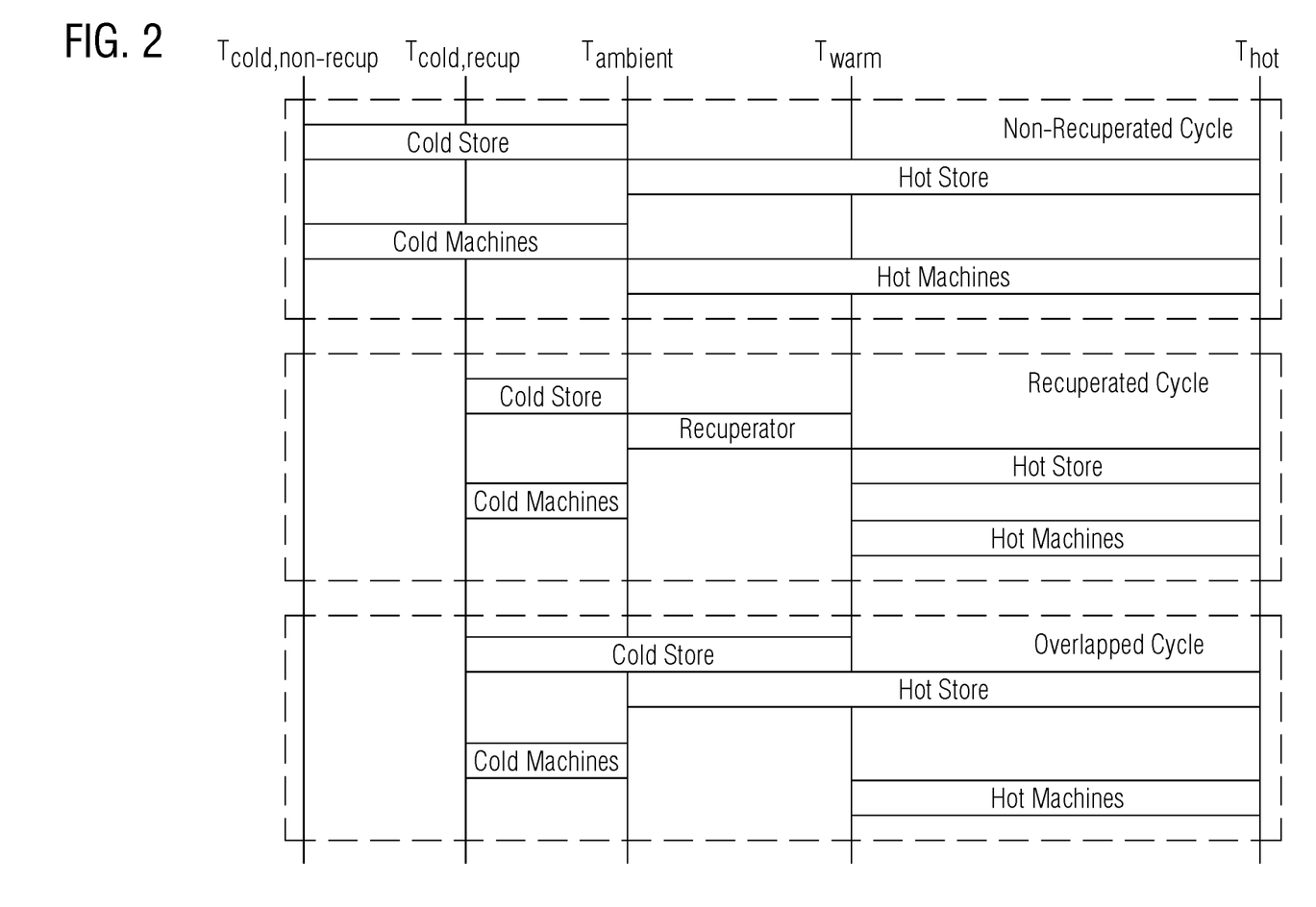
FIG. 2 is a visual tabulation of non-limiting temperature ranges that may be associated with various cycles that may be involved in a generic PHES system including a disclosed PHES system configured with an overlapped cycle; this visual tabulation may be useful for conceptually interrelating the temperature ranges associated with the various PHES cycles.

As may be appreciated in FIG. 2, in the overlapped cycle the cold-temperature heat exchange process (labeled Cold Store) can be extended to a temperature (labeled Twarm) comparable to the recuperator hot-end temperature while the hot-temperature heat exchange process (labeled Hot Store) can be extended to a temperature (labeled Tambient) comparable to the recuperator cold-end temperature. As such, in the overlapped cycle the operable temperature ranges of the respective hot and cold stores overlap and thus the designation "overlapped cycle". This temperature overlap allows reducing the temperature range to which the respective hot and cold turbomachinery are subject to, and this in turn allows reducing the pressure ratio involved in the overlapped cycle, resulting in various benefits to the system and cost reduction based on the elimination of recuperator and concomitant piping. It will be appreciated that in certain applications—such as may involve balancing tradeoffs of efficiency versus costs—disclosed PHES systems may be implemented using the recuperated cycle or a non-recuperated cycle in lieu of the overlapped cycle.

The description below will proceed to describe various non-limiting structural and/or operational relationships in connection with an annular ducting arrangement that may be featured in disclosed PHES systems. Elements having the same reference alphanumeric (or label) as illustrated in a previous figure, unless otherwise stated, provide the same functionality and will not be discussed again to avoid redundant description.

Figure 3:
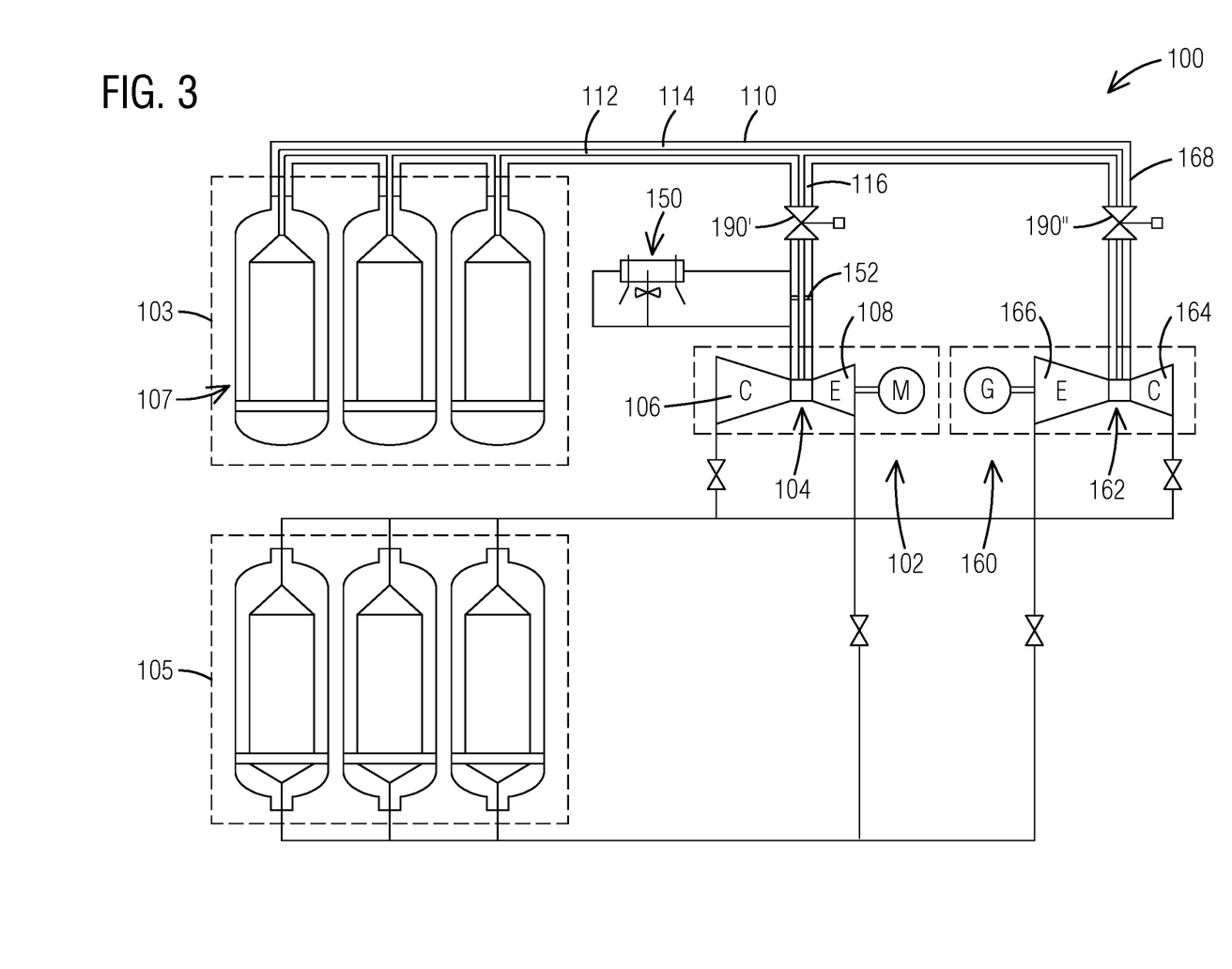
FIG. 3 is a schematic of one non-limiting embodiment of a disclosed PHES system that shows certain structural details in connection with one example of an annular ducting arrangement that may be featured in a disclosed PHES system.

FIG. 3, without limitation, depicts a similar version of the PHES thermodynamic cycle described above in the context of FIG. 1, with a distinction that FIG. 3 is used to elaborate structural and/or operational details regarding an annular ducting arrangement that may be featured in a disclosed PHES system 100 that includes a charging subsystem 102 operable to transfer heat from a cold thermal storage apparatus 105 to a hot thermal storage apparatus 103 that may include one or more hot store units 107 with structural features appropriate for the annular ducting arrangement.

Charging subsystem 102 includes a charging turbomachinery 104 including a hot compressor 106 and a cold expander 108. In one non-limiting embodiment, a ducting arrangement 110 has an inner duct 112 and an annular duct 114 coaxially disposed about the inner duct. In one nonlimiting embodiment, a first portion 116 of inner duct 112 and annular duct 114 may be connected to charging turbomachinery 104 so that inner duct 112 is connected to transmit a high-temperature, high-pressure flow of working fluid from hot compressor 106 to hot thermal storage apparatus 103, and annular duct 114 is connected to transmit a lower-temperature, high-pressure flow of the working fluid that is returned from hot thermal storage apparatus 103 to cold expander 108.

In general, the annular ducting arrangement may be arranged at any selectable location of a path to transmit the high-temperature, high-pressure flow of working fluid and the lower-temperature, high-pressure flow of working fluid between hot thermal storage apparatus 103 and a charging turbomachinery 104 and/or a discharging turbomachinery 162 of the pumped heat energy storage system. That is, based on the needs of a given application, the designer has the flexibility to selectively arrange the annular ducting arrangement at desired locations of the PHES system. In other words, although one could implement a disclosed annular ducting arrangement at each possible location involving flow of high-temperature, high-pressure working fluid between hot thermal storage apparatus 103 and charging turbomachinery 104 and/or a discharging turbomachinery 162, the designer has the flexibility to use a targeted approach for partial implementation of the annular ducting arrangement at desired locations.

For example, non-limiting locations where the annular ducting arrangement may be arranged may involve a turbomachinery ducting arrangement 122 (FIG. 6) in charging turbomachinery 104, and/or may involve a turbomachinery ducting arrangement 172 (FIG. 7) in discharging turbomachinery 162.

In another non-limiting example, the annular ducting arrangement may be arranged in a location involving a valve arrangement 190 to fluidly couple, during a charging cycle of the PHES system, charging turbomachinery 104 to hot thermal storage apparatus 103 and to fluidly couple, during a discharging cycle of the PHES system, discharging turbomachinery 162 to hot thermal storage apparatus 103.

In still another non-limiting example, the annular ducting arrangement may be arranged in a location involving a heat rejection cooler 150 and may include a bulkhead 152 arranged in an annulus defined by the annular duct 114 to divert e.g., during the charging cycle of the PHES system, the lower-temperature, high-pressure flow of working fluid transmitted within the annular duct into heat rejection cooler 150.

Regardless of implementation location, ducting arrangement 100 permits the inner duct 112 that transmits the high-temperature, high-pressure flow to be located inside of the annular duct 114 that transmits the lower-temperature, high-pressure flow, such that the lower temperature flow occupies an annular space between inner duct 112 and an outer wall of annular duct 114.

In one non-limiting embodiment, the high-temperature, high-pressure flow may reach in the charging subsystem a temperature of approximately 2300° F. or more, and a pressure of approximately 500 psi or more. By way of non-limiting comparison, the lower-temperature, high-pressure flow may reach a temperature of approximately 355° F. or more and a pressure of approximately 480 psi or more.

As the high-temperature flow, and the lower temperature flow of working fluid are at commensurate pressures (e.g., relatively close in value to one another)—without limitation, such pressures may be within approximately ten percent from one another in one embodiment—this means that a duct boundary (e.g., a metal structure, such as a liner, or tubular structure) dividing these flows is not subject to any substantial loading on account of a delta pressure at the duct boundary. Accordingly, the metal structure that provides the duct boundary, such as between inner duct 112 and annular duct 114, can be made relatively thin. The outer-most containment of the high-pressure flow may be handled by a relatively thicker structure, such as the outer wall of annular duct 114, where the temperature is lower compared to the temperature in the inner duct 112.

As the duct boundary can be made relatively thin, then such metal structure can be cost-effectively made from a more expensive high-temperature alloy, if so needed. As the duct boundary is not subject to any substantial loading on account of a pressure difference, based on the needs of a given application, bellows-type thermal expansion devices may be used, if so desired. It is further noted that as the duct boundary can be made relatively thin, this is conducive to avoiding undesirable thermal gradients that otherwise could limit the rate of heating or cooling of the system.

As further illustrated in FIG. 3, heat rejection cooler 150 may be disposed upstream of cold expander 108. As noted above, bulkhead 152 may be arranged in the annulus defined by annular duct 114 to divert during the charging cycle of the PHES system the lower-temperature, high-pressure flow of the working fluid being transmitted within annular duct 114 to heat rejection cooler 150 prior to the working fluid being returned to cold expander 108 via annular duct 114.

Figure 6:
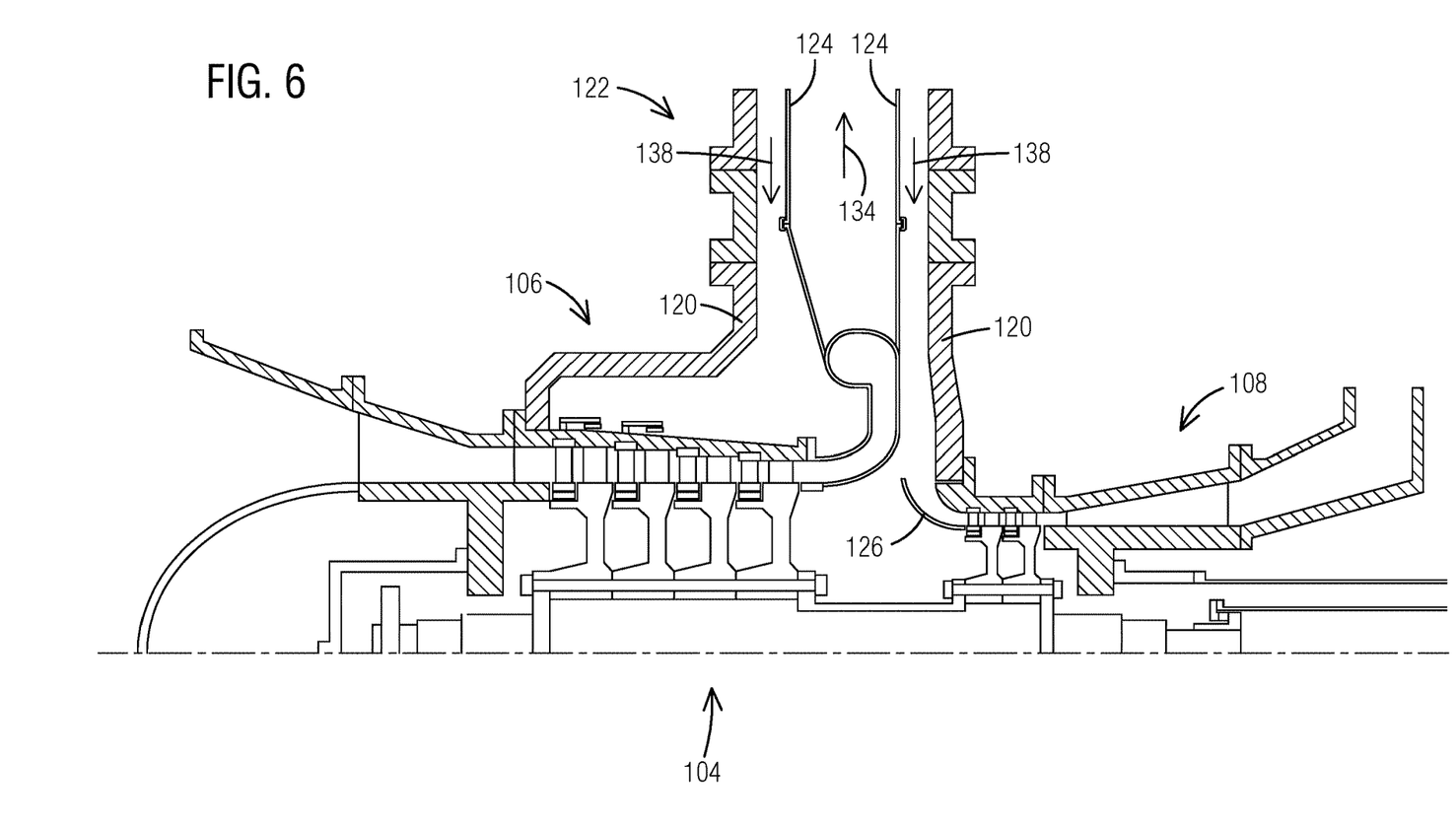
FIG. 6 is a cross-sectional view illustrating one non-limiting embodiment of a disclosed charging turbomachinery that shows certain structural details that may implemented in another example of an annular ducting arrangement.

In one non-limiting embodiment, as schematically illustrated in FIG. 6, charging turbomachinery 104 may have turbomachinery ducting arrangement 122 appropriate for connecting to the annular ducting arrangement, described above in the context of FIG. 3. In one non-limiting embodiment, an outer casing 120 of charging turbomachinery 104 encloses turbomachinery ducting arrangement 122, which may be connected to first portion 116 of inner duct 112 and annular duct 114.

Figure 4:
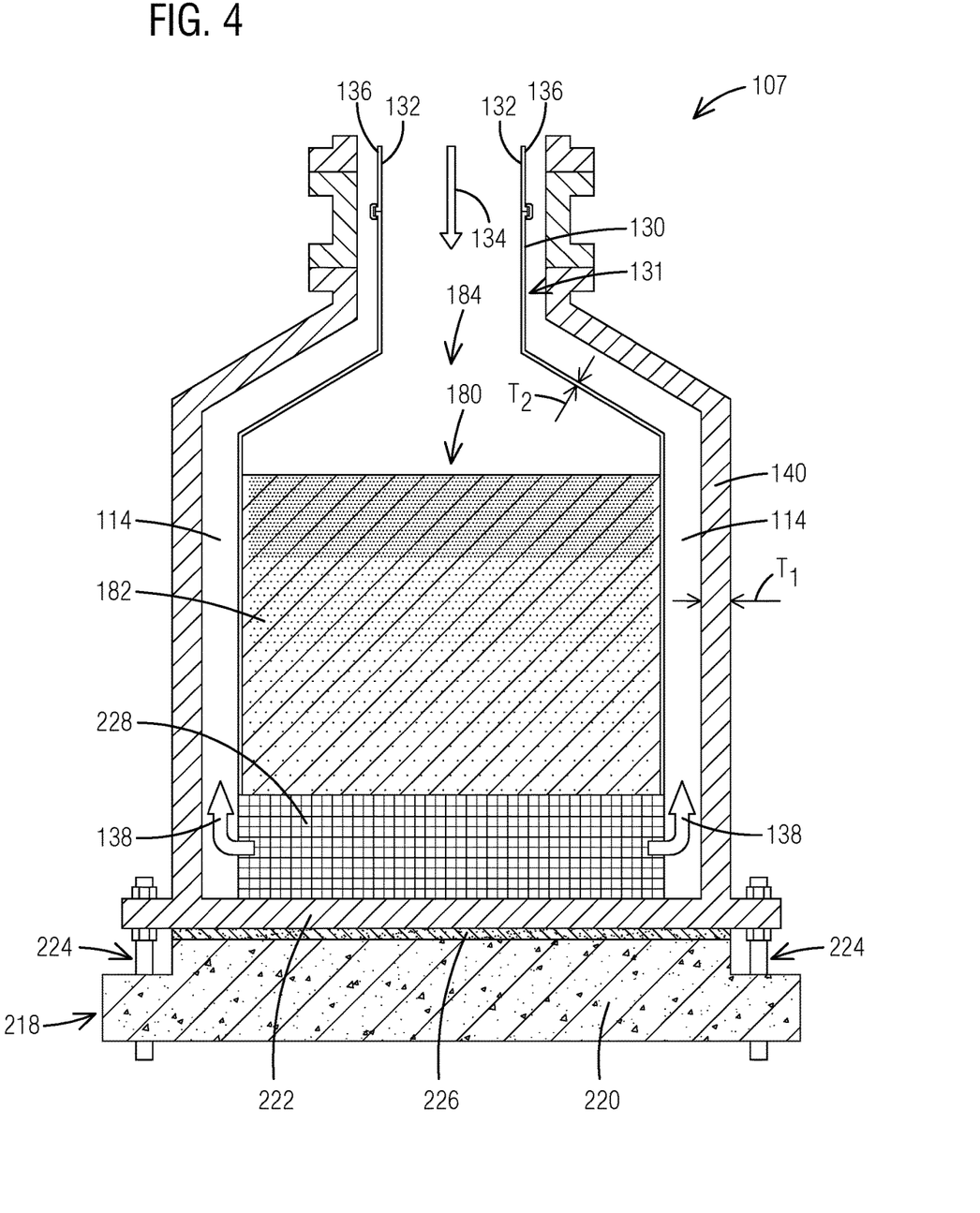
FIG. 4 is a schematic of one non-limiting embodiment of a disclosed hot store unit that shows certain structural details appropriate for the annular ducting arrangement and further shows a schematic flow diagram of a working fluid during a charging cycle of the PHES system.

In one non-limiting embodiment, turbomachinery ducting arrangement 122 defines an outlet 124 of hot compressor 106 that may be connected to first portion 116 (FIG. 3) of inner duct 112 to supply the high-temperature, high-pressure flow of working fluid to hot thermal storage apparatus 103. This high-temperature, high-pressure flow is schematically represented in FIGS. 4 and 6 by respective arrows labeled with reference numeral 134.

Turbomachinery ducting arrangement 122 further defines an inlet 126 of cold expander 108 that may be connected to first portion 116 of annular duct 114 to receive the lower-temperature, high-pressure flow of working fluid returned from hot thermal storage apparatus 103. This lower-temperature, high-pressure flow is schematically represented in FIGS. 4 and 6 by respective arrows labeled with reference numeral 138. It will be appreciated that in the turbomachinery ducting arrangement 122, the lower-temperature, high-pressure flow 138 is coaxially disposed about the high-temperature, high-pressure flow 134, as described above in the context of ducting arrangement 110. For example, at least some portion of inlet 126 of cold expander 108 is coaxially disposed about some portion of outlet 124 of hot compressor 106.

As further illustrated in FIG. 3, PHES system 100 further includes a discharging subsystem 160 operable to transfer heat from hot thermal storage apparatus 103 to cold thermal storage apparatus 105. Discharging subsystem 160 includes discharging turbomachinery 162 including a cold compressor 164 and a hot expander 166.

In one nonlimiting embodiment, a second portion 168 of inner duct 112 and annular duct 114 may be connected to discharging turbomachinery 162 so that annular duct 114 is connected to transmit a high-pressure flow of working fluid from cold compressor 164 into hot thermal storage apparatus 103 and inner duct 112 is connected to transmit a high-temperature, high-pressure flow of working fluid that is returned from hot thermal storage apparatus 103 to hot expander 166. The temperature of the high-pressure flow of working fluid being transmitted within annular duct 114 is lower compared to the high-temperature, high-pressure flow being transmitted within inner duct 112. In one non-limiting embodiment, the high-temperature, high-pressure flow may reach in the discharging subsystem a temperature of approximately 2280° F. or more, and a pressure of approximately 480 psi or more. By way of non-limiting comparison, the lower-temperature, high-pressure flow may reach a temperature of approximately 330° F. or more and a pressure of approximately 500 psi or more.

Figure 7:
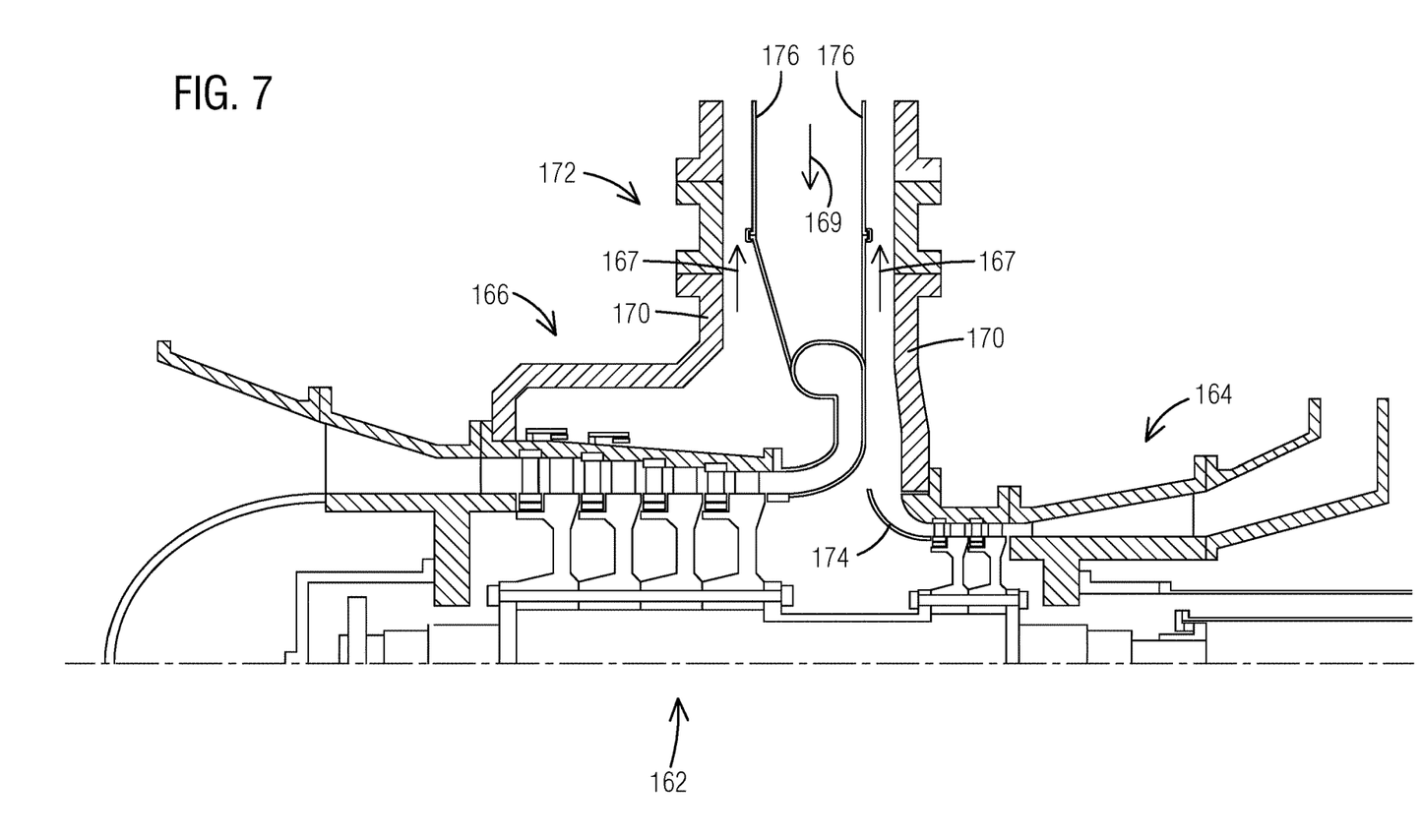
FIG. 7 is a cross-sectional view illustrating one non-limiting embodiment of a disclosed discharging turbomachinery that shows certain structural details that may implemented in still another example of an annular ducting arrangement.

In one non-limiting embodiment, as may be appreciated in FIG. 7, discharging turbomachinery 162 has turbomachinery ducting arrangement 172 appropriate for connecting to the annular ducting arrangement. In one non-limiting embodiment, an outer casing 170 of discharging turbomachinery 162 encloses turbomachinery ducting arrangement 172, which may be connected to second portion 168 of inner duct 112 and annular duct 114.

Figure 5:
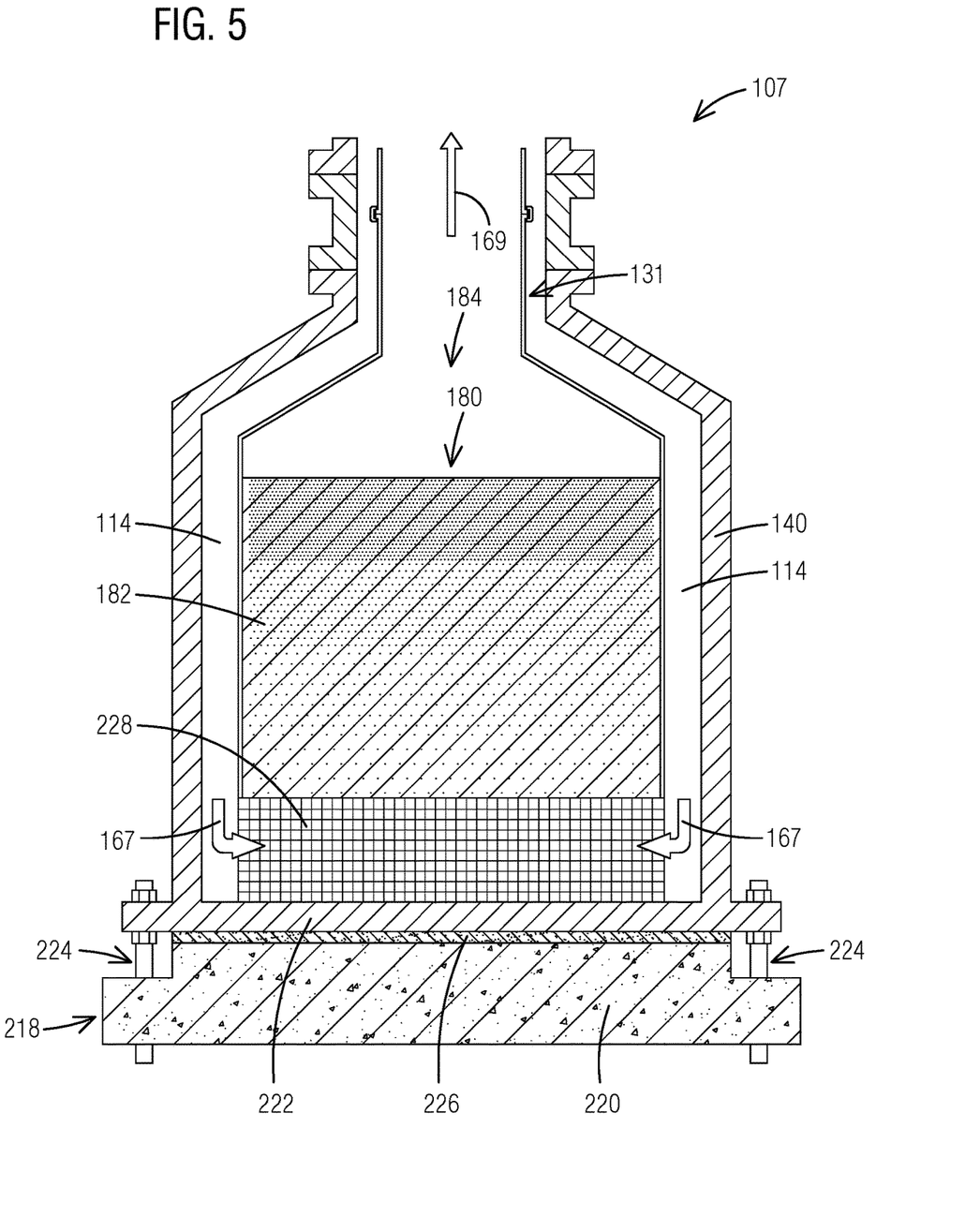
FIG. 5 is a schematic of the disclosed hot store unit shown in FIG. 4 and further shows a schematic flow diagram of the working fluid during a discharging cycle of the PHES system.

In one non-limiting embodiment, turbomachinery ducting arrangement 172 of discharging turbomachinery 162 defines an outlet 174 of cold compressor 164 that may be connected to second portion 168 (FIG. 3) of annular duct 114 to supply the lower-temperature, high-pressure flow of working fluid into hot thermal storage apparatus 103. This lower-temperature, high-pressure flow is schematically represented in FIGS. 5 and 7 by respective arrows labeled with reference numeral 167.

Turbomachinery ducting arrangement 172 of discharging turbomachinery 162 further defines an inlet 176 of hot expander 166 that may be connected to second portion 168 of inner duct 112 to receive the high-temperature, high-pressure flow of working fluid from hot thermal storage apparatus 103. This high-temperature, high-pressure flow is schematically represented in FIGS. 5 and 7 by respective arrows labeled with reference numeral 169.

It will be appreciated that, once again, the lower-temperature, high-pressure flow 167 is coaxially disposed about the high-temperature, high-pressure flow 169, as described above in the context of annular ducting arrangement 110. For example, at least some portion of outlet 174 of cold compressor 164 is coaxially disposed about some portion of inlet 176 of hot expander 166.

As may be appreciated in FIG. 4 (also in FIG. 5) in connection with a hot store unit 107 having structural features appropriate for the annular ducting arrangement, a liner 131 defines the inner duct of the annular ducting arrangement. Liner 131 also forms the inner wall 130 of the annular duct 114 of the annular ducting arrangement. In one non-limiting embodiment, an inner side 132 of liner 131 is subject to the high-temperature, high-pressure flow (schematically represented by arrow 134) of the working fluid being transmitted within the inner duct and an outer side 136 of liner 131 is subject to the lower-temperature, high-pressure flow (schematically represented by arrow 138) of the working fluid being transmitted within the annular duct.

As may be further appreciated in FIGS. 4 and 5, in one non-limiting embodiment, the outer wall 140 of annular duct 114 may be structured to provide pressure-containment to the working fluid that passes through annular duct 114. In one non-limiting embodiment, a cross-section of liner 131 has a lower thickness (schematically represented by arrows labeled T2) compared to a cross section of outer wall 140, (schematically represented by arrows labeled T1). As suggested above, liner 131, which in disclosed embodiments can be made from a relatively thin-metal structure, can be cost-effectively made at desired locations from more expensive high-temperature alloy. It will be appreciated that, based on the needs of a given application, such locations of the liner may optionally be internally thermally-insulated to further reduce the operating temperature of the liner.

In one non-limiting embodiment, hot store unit 107 (FIGS. 4 and 5) has a chamber 180 that contains a thermal storage media 182, e.g., solid thermal storage media, such as may include without limitation, granular materials, such as sand; rock bulk materials, such as quartzite and gneiss rock, including those of volcanic origin, such as basalt rock, diabase rock, and granite rock. In certain embodiments, the thermal storage media may be bulk solid thermal storage media, such as may be or include metal oxides, such as hematite (iron oxide), and alumina (aluminum oxide); and may include cofalit filler material. In certain embodiments, the thermal storage media may comprise ball bulk material, such as single-grain bulk material, such as a comprising spheroids of approximately the same diameter or multi-grain bulk material comprising spheroids of different diameters, etc. In certain applications, the thermal storage media may be or include heat-storage ceramics.

In certain applications, such as involving both natural media and ball bulk material, one may have a thermal store that is "randomly packed", i.e., the combined materials may be poured into the chamber and such combined materials would settle in a natural way. In addition to ball bulk material, it should be appreciated that the media could be in the form of bricks engineered to incorporate channels or holes through which the working fluid may pass and transfer heat to or from the media. It is contemplated that a brick format may be conducive to a "structured packing", which may be an attractive modality because in structured packing one can design at least a portion of the media to bear its own weight down to a supporting foundation. By way of comparison, certain random packings could potentially give rise to hoop stresses acting on the wall of the hot store unit as the material settles.

In one non-limiting embodiment, hot store unit 107 may include a media support system 218, such as may include a supporting foundation 220, e.g., a concrete foundation, and a base 222 of hot store unit 107 may be anchored onto foundation 220 by a bolt assembly 224. In one non-limiting embodiment, a filler 226, e.g., a grout filler, may be used to provide an interface between foundation 220 and the outer surface of base 222. In one non-limiting embodiment, an arrangement of thermally-insulating bricks 228, engineered to pass fluid in at least two directions, (e.g., vertical and horizontal) to allow the working fluid to, for example, pass from annular duct 114 (FIG. 5) toward the center of chamber 180 and establish upward fluid communication through thermal media 182 (or in the reverse direction, (FIG. 4) while providing sufficient load-bearing capability to bear the weight of thermal media 182, which in certain embodiments could be substantially large, e.g., many tons.

As should be now appreciated by those skilled in the art, in general, media support system 218 may be implemented using various modalities for supporting thermal storage media 182. For example, media support in hot store unit 107 may be a bed of random packed material filled from the base 222 of hot store unit 107 to a point where the media forms its own base. Alternatively, the media support in hot store unit 107 may involve structured bricks with holes that permit the flow to enter from/to the annulus and distribute itself across a bottom surface; or the media support in hot store unit 107 could be in the form of a sufficiently strong metal grate with openings, where the grate is in turn supported by a grate support structure (e.g., involving columns and/or beams) extending from the base 222 of hot store unit 107.

In one non-limiting embodiment, chamber 180 has an opening 184 at a first axial end of the chamber that, during the charging cycle, may be in fluid communication with the inner duct to admit into the chamber the high-temperature, high-pressure flow 134 of working fluid from hot compressor 106 (FIG. 6).

In one non-limiting embodiment, the second axial end of chamber 180 may be in fluid communication with annular duct 114—by way of media support system 218—to discharge from chamber 180, during the charging cycle, the lower-temperature, high-pressure flow 138 (FIG. 4) of the working fluid that is returned to cold expander 108.

As can be appreciated in FIG. 5, during the discharging cycle, media support system 218 may be in fluid communication with annular duct 114 to admit into the chamber the lower-temperature, high-pressure flow 167 of working fluid from cold compressor 164, and opening 184 may be in fluid communication with the inner duct to discharge from chamber 180 the high-temperature, high-pressure flow 169 of the working fluid that is returned to hot expander 166.

As shown in FIG. 3, in one-non-limiting embodiment, a valve arrangement 190 may be used to fluidly couple during the charging cycle charging turbomachinery 104 to hot thermal storage apparatus 103, and to fluidly couple during the discharging cycle discharging turbomachinery 162 to hot thermal storage apparatus 103.

In one-non-limiting embodiment, the valve arrangement includes a first valve assembly 190', such as may be arranged in the first portion 116 of the inner duct and the annular duct, and configured to: 1) in the charging cycle, fluidly couple charging turbomachinery 104 to hot thermal storage apparatus 103 and 2) in the discharging cycle, decouple discharging turbomachinery 162 from the hot thermal storage apparatus; and a second valve assembly 190" that may be arranged in the second portion 168 of the inner duct and the annular duct, and configured to: 1) in the discharging cycle, fluidly couple the discharging turbomachinery 162 to hot thermal storage apparatus 103, and 2) in the charging cycle decouple the charging turbomachinery 104 from the hot thermal storage apparatus.

Figure 8:
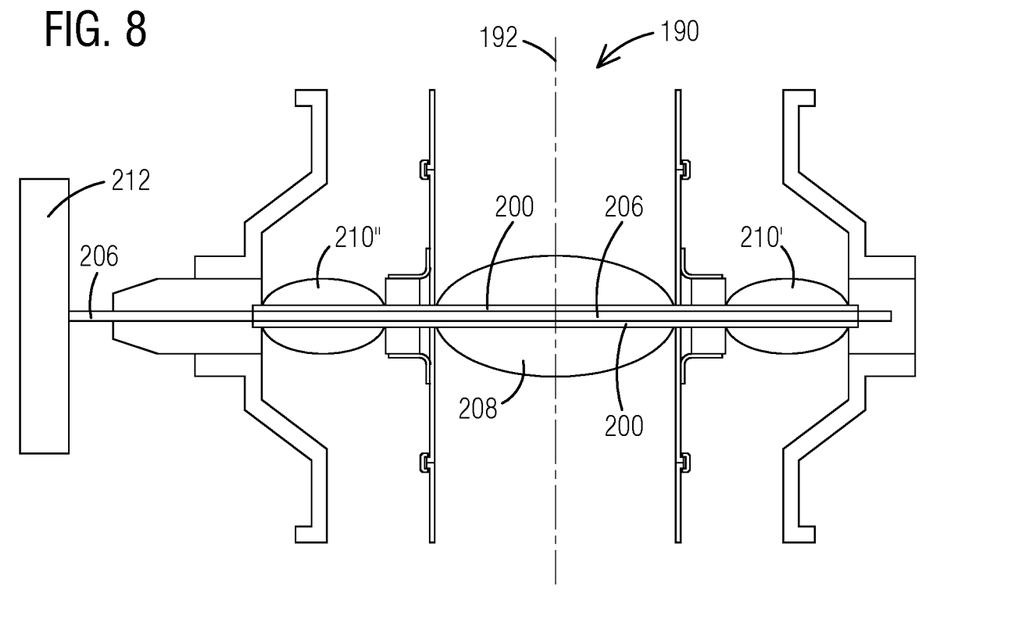
FIG. 8 is a sectional view of one non-limiting embodiment of a disclosed valve arrangement that shows certain structural details that may implemented in yet another example of an annular ducting arrangement.
Figure 9:
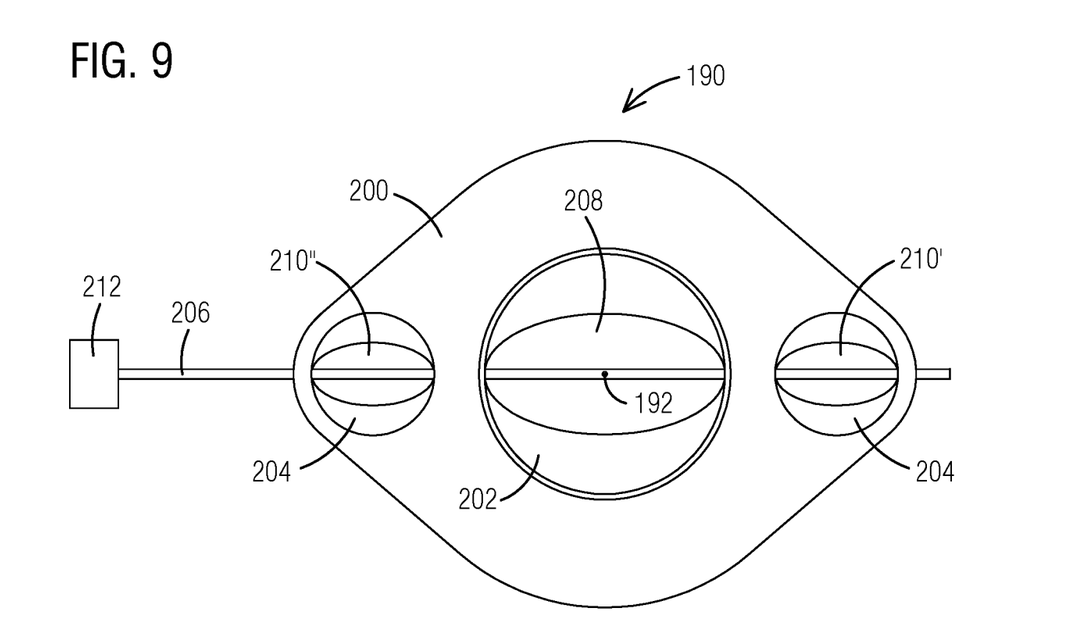
FIG. 9 is a top view of the valve arrangement shown in FIG. 8.

As shown in FIGS. 8 and 9, in one-non-limiting embodiment, each valve assembly 190 has a plate 200 in a plane orthogonal to a longitudinal axis of a respective inner duct. (This axis is schematically represented by line 192 in FIG. 8), and a dot 192 FIG. 9). Plate 200 defines a central opening 202 in the inner duct and further defines two openings 204 in the annular duct. An actuating shaft 206 may extend orthogonal to longitudinal axis 192.

In in one-non-limiting embodiment, a first valve element 208 may be disposed in central opening 202. A second valve element 210' and a third valve element 210" may each be respectively disposed in the two openings 204 defined by plate 200 in the annular duct. The first, the second and the third valve elements 208, 210 may each be mounted on actuating shaft 206. In one non-limiting embodiment, each valve element may be a butterfly-style flap responsive to a rotation position of actuating shaft 206—e.g., responsive to an actuator 212—to be simultaneously either in a closed condition or in an open condition relative to the working fluid that passes within the respective inner duct and within the respective annular duct.

In operation, disclosed embodiments are believed to resolve the issue of containing the high-temperature working fluid at elevated pressure by appropriately compartmentalizing the functions of temperature management and pressure containment in a cost-effective and reliable manner. In a disclosed PHES system, this is favorably achieved by constructing at least portions of the high-temperature portion of the system with an annular configuration.

In operation, the stores and ducts involved in a disclosed PHES system may be cost-effectively manufactured since use of high-temperature alloys may be reduced while providing reliable and long-lasting usability.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A pumped heat energy storage system characterized by:
    an annular ducting arrangement having an inner duct and an annular duct coaxially disposed about the inner duct, wherein the inner duct is arranged to transmit a high-temperature, high-pressure flow of a working fluid while the annular duct is arranged to transmit a lower-temperature, high-pressure flow of the working fluid, wherein the annular ducting arrangement is arranged at a selectable location of a path to transmit the high-temperature, high-pressure flow of working fluid and the lower-temperature, high-pressure flow of working fluid between a hot thermal storage apparatus of the pumped heat energy storage system and a charging turbomachinery and/or a discharging turbomachinery of the pumped heat energy storage system.

2. The pumped heat energy storage system of claim 1, wherein the charging turbomachinery includes a hot compressor and a cold expander, wherein the annular ducting arrangement is arranged at the charging turbomachinery, which has an outer casing that encloses a turbomachinery ducting arrangement that is connected to a first portion of the inner duct and the annular duct, the turbomachinery ducting arrangement defining an outlet of the hot compressor that is connected to the first portion of the inner duct to supply the high-temperature, high-pressure flow of working fluid to the hot thermal storage apparatus, the turbomachinery ducting arrangement further defining an inlet of the cold expander that is connected to the first portion of the annular duct to receive the lower-temperature, high-pressure flow of working fluid from the hot thermal storage apparatus, wherein the inlet of the cold expander is coaxially disposed about the outlet of the hot compressor.

3. The pumped heat energy storage system of claim 1, wherein the discharging turbomachinery includes a cold compressor and a hot expander, wherein the annular ducting arrangement is arranged at the discharging turbomachinery which has an outer casing that encloses a turbomachinery ducting arrangement that is connected to a second portion of the inner duct and the annular duct, the turbomachinery ducting arrangement of the discharging turbomachinery defining an outlet of the cold compressor that is connected to the second portion of the annular duct to supply the lower-temperature, high-pressure flow of working fluid into the hot thermal storage apparatus, the turbomachinery ducting arrangement further defining an inlet of the hot expander that is connected to the second portion of the inner duct to receive the high-temperature, high-pressure flow of working fluid from the hot thermal storage apparatus, and, wherein the outlet of the cold compressor is coaxially disposed about the inlet of the hot expander.

4. The pumped heat energy storage system of claim 1, wherein the annular ducting arrangement is in a valve arrangement to fluidly couple, during a charging cycle, the charging turbomachinery to the hot thermal storage apparatus and to fluidly couple, during a discharging cycle, the discharging turbomachinery to the hot thermal storage apparatus.

5. The pumped heat energy storage system of claim 1, wherein the annular ducting arrangement is operatively coupled to a heat rejection cooler and includes a bulkhead disposed in an annulus defined by the annular duct to divert the lower-temperature, high-pressure flow of working fluid transmitted during the charging cycle within the annular duct into the heat rejection cooler.

6. The pumped heat energy storage system of claim 1, wherein the hot thermal storage apparatus includes a hot store unit, wherein the annular ducting arrangement is arranged in the hot store unit, which has a liner that defines the inner duct and forms an inner wall of the annular duct, and wherein an inner side of the liner is subject to the high-temperature, high-pressure flow of the working fluid transmitted within the inner duct and an outer side of the liner is subject to the lower-temperature, high-pressure of the working fluid transmitted within the annular duct, and wherein said respective pressures are within ten percent from one another.

7. The pumped heat energy storage system of claim 6, wherein an outer wall of the annular duct is structured to provide pressure-containment, wherein a cross section of the liner has a lower thickness compared to a cross section of the outer wall.

8. The pumped heat energy storage system of claim 3, wherein the hot thermal storage apparatus includes a hot store unit having a chamber that contains a thermal media, wherein the chamber has an opening at a first axial end of the chamber that, during a charging cycle, is in fluid communication with the inner duct to admit into the chamber the high-temperature, high-pressure flow of working fluid from the hot compressor, wherein the chamber has a media support system at a second axial end of the chamber opposite the first axial end of the chamber, the second axial end of the chamber in fluid communication with the annular duct to discharge from the chamber the lower-temperature, high-pressure flow of the working fluid to the cold expander, wherein, during a discharging cycle, the second axial end of the chamber is in fluid communication with the outer duct to admit into the chamber the lower-temperature, high-pressure flow of working fluid from the cold compressor, and wherein the opening of the chamber is in fluid communication with the annular duct to discharge from the chamber the high-temperature, high-pressure flow of the working fluid to the hot expander.

9. The pumped heat energy storage system of claim 8, wherein the thermal media is a solid thermal media selected from the group consisting of a randomly packed natural material, a structured packing formed by bricks with channels engineered to pass the working fluid, and a combination of the randomly packed natural material and the structured packing.

10. The pumped heat energy storage system of claim 4, wherein the valve arrangement includes a first valve assembly arranged in the first portion of the inner duct and the annular duct, and configured to: 1) in the charging cycle, fluidly couple charging turbomachinery to hot thermal storage apparatus and 2) in the discharging cycle, decouple discharging turbomachinery from the hot thermal storage apparatus; and a second valve assembly in the second portion of the inner duct and the annular duct, and configured to: 1) in the discharging cycle, fluidly couple the discharging turbomachinery to hot thermal storage apparatus, and 2) in the charging cycle decouple the charging turbomachinery from the hot thermal storage apparatus.

11. The pumped heat energy storage system of claim 10, wherein each valve assembly comprises:

a plate in a plane orthogonal to a longitudinal axis of a respective inner duct, the plate defining a central opening in the respective inner duct and further defining two openings in the annular duct;

an actuating shaft that extends orthogonal to the longitudinal axis;

a first valve element disposed in the central opening; and a second valve element and a third valve element each respectively disposed in the two openings defined by the plate in the annular duct, wherein the first, the second and the third valve elements is each mounted on the actuating shaft, wherein each valve element includes a butterfly-style flap responsive to a rotation position of the actuating shaft to be simultaneously either in a closed condition or in an open condition relative to the working fluid transmitted within the respective inner duct and within the respective annular duct.

12. A pumped heat energy storage system comprising:

a charging subsystem operable to transfer heat from a cold thermal storage apparatus to a hot thermal storage apparatus, wherein the charging subsystem includes a charging turbomachinery including a hot compressor and a cold expander; and an annular ducting arrangement that has an inner duct and an annular duct coaxially disposed about the inner duct, wherein a first portion of the inner duct and the annular duct is connected to the charging turbomachinery, wherein the inner duct is connected to transmit a high-temperature, high-pressure flow of working fluid from the hot compressor to the hot thermal storage apparatus, and wherein the annular duct is connected to transmit a lower-temperature, high-pressure flow of the working fluid that is returned from the hot thermal storage apparatus to the cold expander.

13. The pumped heat energy storage system of claim 12, wherein the charging turbomachinery has an outer casing that encloses a turbomachinery ducting arrangement that is connected to the first portion of the inner duct and the annular duct, the turbomachinery ducting arrangement defining an outlet of the hot compressor that is connected to the first portion of the inner duct to supply the high-temperature, high-pressure flow of working fluid to the hot thermal storage apparatus, the turbomachinery ducting arrangement further defining an inlet of the cold expander that is connected to the first portion of the annular duct to receive the lower-temperature, high-pressure flow of the working fluid from the hot thermal storage apparatus, wherein the inlet of the cold expander is coaxially disposed about the outlet of the hot compressor.

14. The pumped heat energy storage system of claim 12, wherein the hot thermal storage apparatus includes a hot store unit having a liner that defines the inner duct and forms an inner wall of the annular duct, and wherein an inner side of the liner is subject to the high-temperature, high-pressure flow of the working fluid transmitted within the inner duct and an outer side of the liner is subject to the lower-temperature, high-pressure of the working fluid transmitted within the annular duct, and wherein said respective pressures are within ten percent from one another.

15. The pumped heat energy storage system of claim 14, wherein an outer wall of the annular duct is structured to provide pressure containment, wherein a cross section of the liner has a lower thickness compared to a cross section of the outer wall.

16. The pumped heat energy storage system of claim 12, further comprising a heat rejection cooler disposed upstream of the cold expander, and a bulkhead arranged in an annulus defined by the annular duct to divert the lower-temperature, high-pressure flow of the working fluid being transmitted within the annular duct to the heat rejection cooler prior to the working fluid being returned to the cold expander via the annular duct.

17. The pumped heat energy storage system of claim 12, wherein the charging subsystem is arranged to perform, during a charging cycle of the pumped heat energy storage system, a thermodynamic heat pump cycle that utilizes electrical energy, the pumped heat energy storage system further comprising a discharging subsystem arranged to perform, during a discharging cycle of the pumped heat energy storage system, a thermodynamic engine cycle to produce work, as heat is transferred from the hot thermal storage apparatus to the cold thermal storage apparatus, so that at least a portion of the electrical energy utilized by the charging subsystem is returned, wherein the discharging subsystem includes a discharging turbomachinery 162 including a cold compressor and a hot expander, wherein a second portion of the inner duct and the annular duct is connected to the discharging turbomachinery;

wherein the annular duct is connected to transmit a high-pressure flow of working fluid from the cold compressor into the hot thermal storage apparatus, and wherein the inner duct is connected to transmit a high-temperature, high-pressure flow of working fluid that is returned from the hot thermal storage apparatus to the hot expander, wherein a temperature of the high-pressure flow of working fluid being transmitted within the annular duct is lower compared to the high-temperature, high-pressure flow being transmitted within the inner duct.

18. The pumped heat energy storage system of claim 17, wherein the discharging turbomachinery has an outer casing that encloses a turbomachinery ducting arrangement that is connected to the second portion of the inner duct and the annular duct, the turbomachinery ducting arrangement of the discharging turbomachinery defining an outlet of the cold compressor that is connected to the second portion of the annular duct to supply the lower-temperature, high-pressure flow of working fluid into the hot thermal storage apparatus, the turbomachinery ducting arrangement of the discharging turbomachinery further defining an inlet of the hot expander that is connected to the second portion of the inner duct to receive the high-temperature, high-pressure flow of working fluid from the hot thermal storage apparatus, and, wherein the outlet of the cold compressor is coaxially disposed about the inlet of the hot expander.

19. The pumped heat energy storage system of claim 17, wherein the hot thermal storage apparatus includes a hot store unit having a chamber that contains thermal media, the chamber having an opening at a first axial end of the chamber that, during the charging cycle, is in fluid communication with the inner duct to admit into the chamber the high-temperature, high-pressure flow of working fluid from the hot compressor, a media support system at a second axial end of the chamber opposite the first axial end of the chamber, the second axial end of the chamber in fluid communication with the annular duct to discharge from the chamber the lower-temperature, high-pressure flow of the working fluid that is returned to the cold expander, wherein, during the discharging cycle, the second axial end of the chamber is in fluid communication with the outer duct to admit into the chamber the lower-temperature, high-pressure flow of working fluid from the cold compressor, and wherein the opening of the chamber is in fluid communication with the annular duct to discharge from the chamber the high-temperature, high-pressure flow of the working fluid that is returned to the hot expander.

20. The pumped heat energy storage system of claim 19, wherein the thermal media is a solid thermal media selected from the group consisting of a randomly packed natural material, a structured packing formed by bricks with channels engineered to pass the working fluid, and a combination of the randomly packed natural material and the structured packing.

21. The pumped heat energy storage system of claim 17, further comprising a valve arrangement to fluidly couple during the charging cycle the charging turbomachinery to the hot thermal storage apparatus and to fluidly couple during the discharging cycle the discharging turbomachinery to the hot thermal storage apparatus.

22. The pumped heat energy storage system of claim 21, wherein the valve arrangement includes a first valve assembly arranged in the first portion of the inner duct and the annular duct, and configured to: 1) in the charging cycle, fluidly couple charging turbomachinery to hot thermal storage apparatus and 2) in the discharging cycle, decouple discharging turbomachinery from the hot thermal storage apparatus; and a second valve assembly in the second portion of the inner duct and the annular duct, and configured to: 1) in the discharging cycle, fluidly couple the discharging turbomachinery to hot thermal storage apparatus, and 2) in the charging cycle decouple the charging turbomachinery from the hot thermal storage apparatus.

23. The pumped heat energy storage system of claim 22, wherein each valve assembly comprises:
- a plate in a plane orthogonal to a longitudinal axis of a respective inner duct, the plate defining a central opening in the respective inner duct and further defining two openings in the annular duct;
- an actuating shaft that extends orthogonal to the longitudinal axis;
- a first valve element disposed in the central opening; and
- a second valve element and a third valve element each respectively disposed in the two openings defined by the plate in the annular duct,
wherein the first, the second and the third valve elements is each mounted on the actuating shaft, wherein each valve element includes a butterfly-style flap responsive to a rotation position of the actuating shaft to be simultaneously either in a closed condition or in an open condition relative to the working fluid transmitted within the respective inner duct and within the respective annular duct.

* * * * *